United States Patent [19]

Rosenbaum

[11] 3,885,090

[45] May 20, 1975

[54] CONTINUOUS AUTOMATIC SURVEILLANCE SYSTEM

[76] Inventor: Richard W. Rosenbaum, 2618 Colonial Way, Bloomfield Hills, Mich. 48013

[22] Filed: Mar. 20, 1973

[21] Appl. No.: 343,041

[52] U.S. Cl. ....................... 178/6.6 A; 178/DIG. 38

[51] Int. Cl. ............................................ H04n 5/78

[58] Field of Search ......... 178/6.6 A, 6.6 R, DIG. 1, 178/33, 36, 38; 360/5

[56] References Cited

UNITED STATES PATENTS

| | | | |
|---|---|---|---|
| 3,222,979 | 12/1965 | Webster | 178/DIG. 36 |
| 3,467,771 | 9/1969 | Polack | 178/6.6 A |
| 3,580,998 | 5/1971 | Hammond et al. | 178/DIG. 38 |
| 3,641,266 | 2/1972 | Stults | 178/DIG. 33 |
| 3,686,434 | 8/1972 | Lemelson | 178/6.6 A |

*Primary Examiner*—Vincent P. Canney

*Attorney, Agent, or Firm*—Lane, Aitken, Dunner & Ziems

[57] ABSTRACT

A video tape recorder continuously records video images of an area under surveillance on an endless tape loop. When a sensor detects a disturbance, the sensor starts an interval timer which stops the video recorder after a predetermined period of time following the disturbance. A plurality of read heads are positioned around the endless tape loop to selectively monitor one of a plurality of past time periods. By superimposing a grid pattern on the video image and providing predetermined spaced markings on the floor or wall of the area under surveillance, a subject's movements may be measured and tabulated to form a "motion print" characteristic of the subject for later identification.

14 Claims, 8 Drawing Figures

CONTINUOUS AUTOMATIC SURVEILLANCE SYSTEM

BACKGROUND OF THE INVENTION

The invention relates generally to the field of automatic surveillance and intrusion detection equipment, and more particularly, to video tape recorders controlled by means for detecting a disturbance and to means for enhancing the value of video recordings used for identification.

Video recording systems have been used in the past to maintain surveillance over controlled areas such as a bank floor or a warehouse. The simplest system employs continuous recording with standard reel-to-reel video tape transports. The main disadvantages of this type of continuous recording system are its cost and the extremely frequent routine of changing the video tape reels. The most common variation on the continuous recording system is to arrange for a normally "off" video recorder to be activated by an alarm signal. There are several disadvantages of this conventional system. First, any movement, for example, by a bank teller to press a button or other type of switch to activate the recorder may provoke the suspect. Second, when the camera is activated by the hold-up victim, the crime may be nearly completed and an opportunity for full coverage of the suspect may have been lost.

SUMMARY OF THE INVENTION

Accordingly, the general purpose of the invention is to improve automatic surveillance systems such that a minimum amount of video tape is required for filming a scene immediately before, during and after a crime is committed without requiring routine replacement of video tape. Another object is to provide a system which will record a crime or other activity without requiring any action at the time of the crime itself which might provoke the suspects. A further object of the invention is to enhance the court room value of a recording of a crime by providing means to generate a "motion print" which identifies various unique characteristics of a suspect's movements which may be used for identification, particularly in cases where the suspect is either disguised or his distinguishing features are hidden from view.

These and other objects of the invention are achieved by continuously recording a scene under surveillance on an endless recording medium which is automatically stopped after a predetermined time interval following automatic sensing of a disturbance. In one embodiment, an audio sensor issues a signal when the sound level at the scene reaches a predetermined level. The signal from the audio sensor starts an interval timer set to produce a control signal after a period of twenty minutes, for example. The timer signal stops the video recorder, thus preserving a video record of the scene before, during and after the disturbance which raised the sound level. Alternatively, the video recorder may be turned off manually after the suspect has left the scene of the crime. In another embodiment, particularly useful in guarded areas after hours, such as in a bank or warehouse, the audio sensor is replaced by a conventional ultrasonic motion detector device. When the output of the ultrasonic detector reaches a predetermined level the interval timer is started. A number of different embodiments of endless tape loop systems are disclosed. All of these embodiments allow the positioning of a plurality of read heads at predetermined intervals along the recording medium. The read heads allow selective monitoring of any one of a plurality of past recorded scenes.

To enhance the value of video recordings as court room evidence, a system is described for producing measured indicia of an individual's characteristic movements. Overlaying a reference grid on the video image allows precise analysis of an individual's motion. For example, if the individual sways or weaves to one side while walking, the angular deviation can be precisely measured, or the arc through which he swings his arms while walking can be recorded. In combination, all of these indicia can be tabulated to generate a motion print characteristic of an individual's movements. A pattern of precisely spaced markings on the floor or wall of the scene under surveillance can aide in measuring such aspects of an individual's motion as the length and lateral spacing of his stride.

FIGS. **5*a*, 5*b* and 5*c*** are schematic diagrams of a grid overlay illustrating its use in analyzing different measurable characteristics of an individual's motion.

Figure 6:
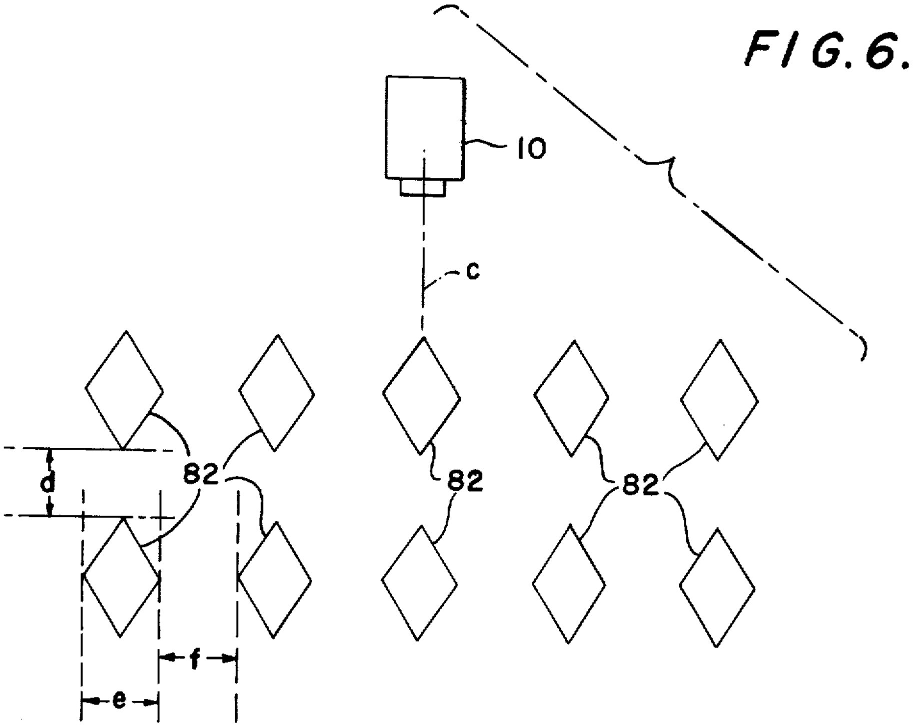

FIG. 6 is a schematic diagram illustrating one example of an arrangement of geometrical markings on the floor of a scene under surveillance.

DESCRIPTION OF THE PREFERRED EMBODIMENTS

Figure 1:
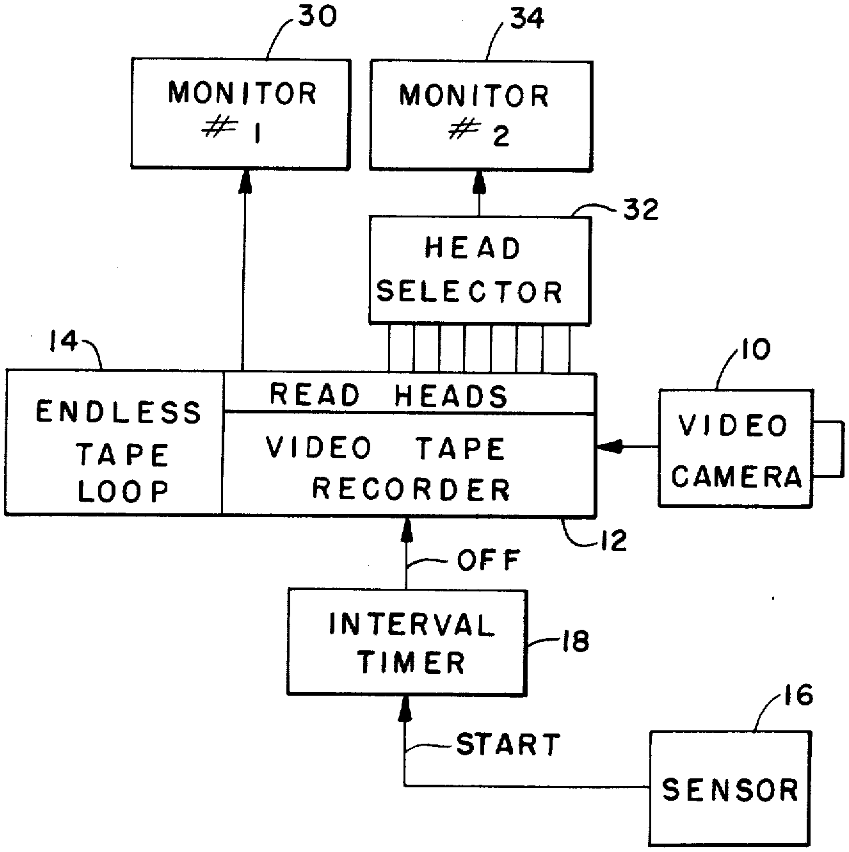
FIG. 1 is a block diagram illustrating an automatic video surveillance system according to the invention.

The automatic video surveillance system shown in diagramatical form in FIG. 1 is normally used to provide a running video record of activities in a guarded area such as a bank floor, a garage entrance or a warehouse. While the system is designed primarily to record criminal activity, recording of other unexpected activities, such as scientific phenomena, represents another application of the invention. Another application is to video record the boarding of passengers at an airline terminal. In the event of an airplane crash, skyjacking, or other emergency, the video tape would provide an accurate record of those passengers and crew members who entered the airplane through the boarding area under surveillance.

While the description below refers to video recording, it is equally applicable to simultaneous audiovisual recording. The audio recording might permit a subsequent "voice print", which, when used with the above-mentioned motion print, would enhance positive identification.

In FIG. 1 a conventional video camera 10, such as a vidicon or a specialty unit such as a low light intensifier camera, produces a continuous video signal output representing the scene under surveillance to a video recorder 12 which records the output of the camera 10 on an endless magnetic tape transport system 14. The tape loop 14 is preferably embodied in a removable cartridge. A sensor 16 produces an output signal indicative of a disturbance to an interval timer 18 connected to deactivate the video recorder 12 following a predetermined interval of time. The sensor 16 may be an audio sensor which emits a control signal if the sound level in the guarded area reaches a predetermined level. The sensor 16 may also represent a photoelectric cell which detects the interruption of a beam of light at the entrance to a guarded area. Altenatively, the sensor 16 may comprise a conventional ultrasonic detection system responsive to movement in the guarded area. Other types of sensors compatible with the video recording system may be used if desired. The interval timer 18 is preferably capable of manual adjustment to alter the recording interval after actuation in accordance with specific requirements. For example, twenty minutes may be sufficient for recording bank hold-ups while an hour may be preferable for warehouse buglarlies.

In operation, the video recorder is on continuously in the absence of a disturbance. As a result, new video signals are recorded over and thus erase the old video signals on the endless tape loop as the tape is recycled. When a disturbance is detected by the sensor 16, such as a loud noise sensed by an audio sensor, the interval timer 18 is started. At the end of the interval, the timer 18 sends a signal to the video recorder 12 which turns the video recorder off, thus preserving a video recording of events before, during and after the disturbance.

In situations where the initiation of a burglary, for example, is certain to be detected by the sensor 16, for instance, an ultrasonic device in a warehouse, it may be permissible to leave the recorder 12 off normally, and use the sensor 16 to turn the recorder on for a period of time determined by the timer 18 in the same manner as in the continuously on system described above.

Figure 2:
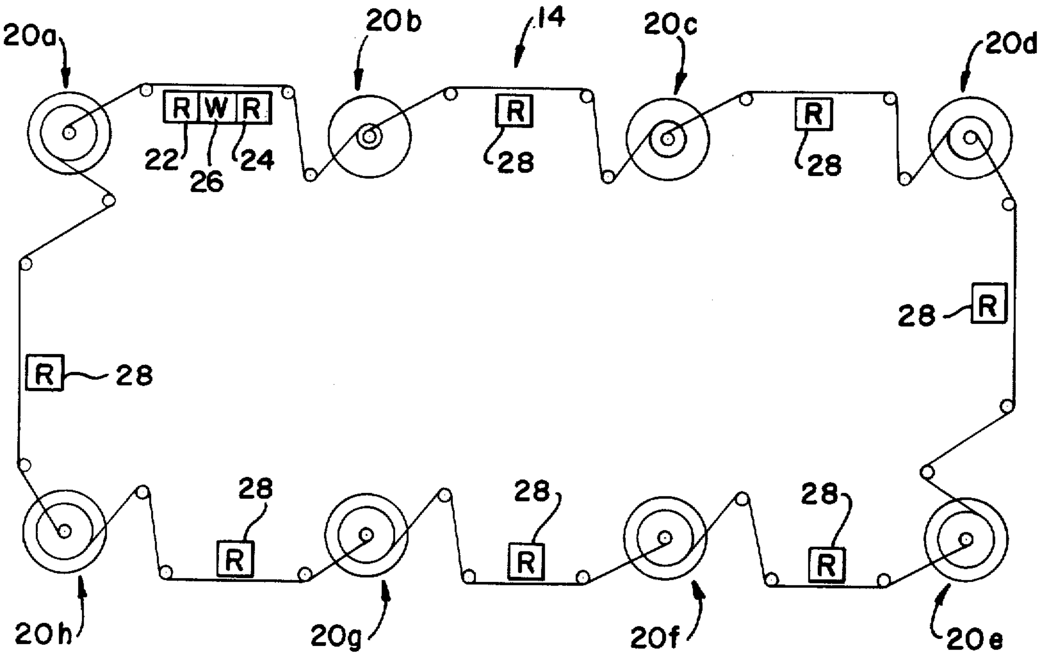
FIGS. 2, 3 and 4 are schematic diagrams illustrating three different embodiments of the endless recording medium incorporated in FIG. 1.

In FIG. 2 a preferred embodiment of the endless tape loop system 14 of FIG. 1 includes eight tape reels 20*a* – 20*h* arranged in two parallel lines each having four spaced reels. Magnetic tape is advanced clockwise from one reel to the next around a closed path. Each of the tape reels 20*a* – 20*h* is of the center feeding type in which tape is wound onto the outer perimeter of the tape reel while tape is simultaneously fed out of the reel from the center. Consequently, the amount of tape wound on each reel remains constant as the reel turns. Between the first two reels, 20*a* and 20*b*, two read heads (designated by the letter R) 22 and 24 are arranged. A write head (designated by the letter W) 26 is mounted between the two read heads 22 and 24. As the tape moves from tape reel 20*a*, by the heads 22, 24 and 26 and onto the reel 20*b*, the tape passes the write head 26 which causes new video images to be recorded on the tape. The reel 20*b* has a 1 minute winding of tape. The next reel 20*c* has a 3 minute winding, and reel 20*d* has a 6 minute winding. The other reels 20*a* and 20*e* – 20*h* all have 10 minute supplies of tape. Between each pair of reels, except for reels 20*a* and 20*b*, a single read head 28 is located. This particular allotment of tape to the various reels is merely one example. Any amount of tape, up to the maximum capacity of an individual reel, may be wound on any of the tape reels within the system.

The read heads 22, 24 and 28 (designated seven heads) correspond to the nine read heads shown for the video tape recorder 12 in FIG. 1. All of the read and write heads may be contained in a removable cartridge with the eight reels, or be separately mounted in the video recorder 12 so as to engage the tape when the cartridge is inserted. Head 24 is connected directly to a first monitor 30 in FIG. 1. The eight other heads, 22 and 28, are connected via a head selector 32 to a second monitor 34. The head selector 32 enables the operator to select one of the heads 22 and 28 for connection to the second monitor 34. Each head 28 or 22 presents a different amount of delay. For example, head 28 following tape reel 20*b* will represent a one minute delay so that events happening one minute before the present time will be monitored. Similarly, the other read heads 28 will present delays of 4, 10, 20, 30, 40, and 50 minutes. Head 22 will monitor events as they occurred 60 minutes ago.

Figure 3:
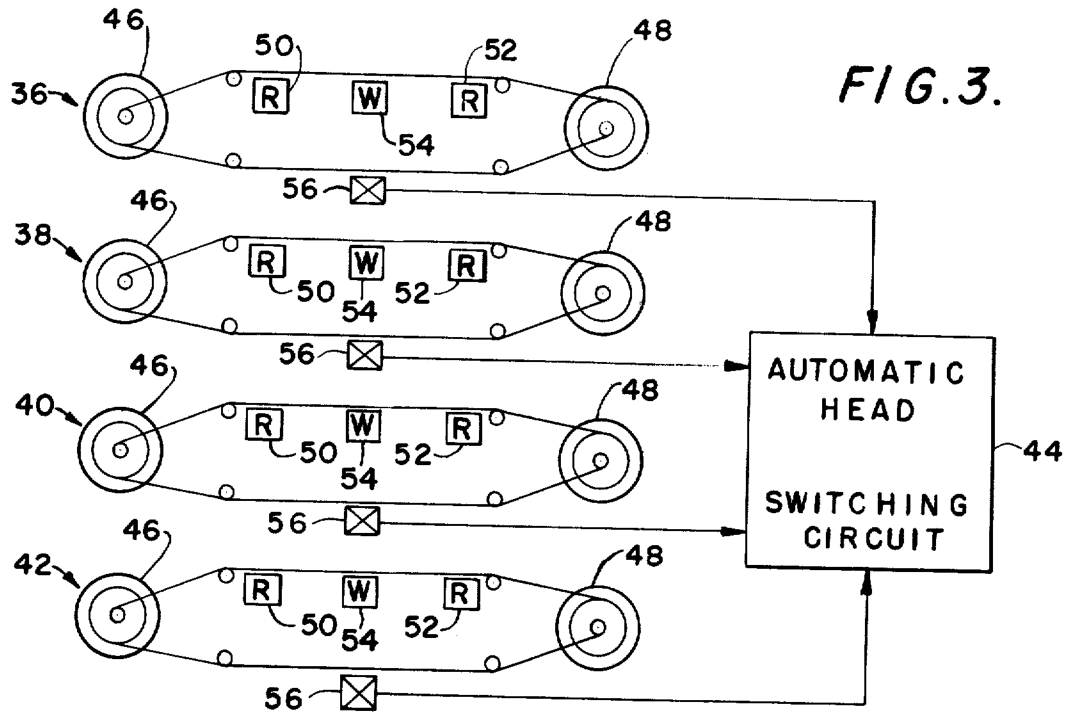

In FIG. 3 an alternative arrangement uses a plurality of synchronously driven individual tape loops 36, 38, 40 and 42 which are employed for recording in a repetitive sequence by means of an automatic head switching circuit 44. Preferably, each of the tape loops is in a separate cassette, separately removable to facilitate replacement. Each of the identical tape loops contains a pair of continuously running, center feeding tape reels 46 and 48 receiving tape from and feeding tape to the other of the pair of tape reels 46 and 48. Along one of the tape channels between the reels 46 and 48, a pair of spaced read heads 50 and 52 are operatively mounted with a write head 54 mounted between them. Along the other tape channel, a position sensor (designated by the letter X) 56 is mounted sensitive to passage of a particular position or "tape mark" on the tape loop. The sensor 56 may be a magnetic, electronic or optical sensor, for instance, responsive to a piece of reflective tape attached to the magnetic tape loop. When the tape mark passes the sensor 56 for tape loop 36, for example, and the video tape recorder is in the record mode, the automatic head switching circuit causes the write head associated with the recording tape loop 36 to be deactivated, possibly after a programmed delay of short duration to ensure that critcally important evidence is thoroughly recorded on the tape, and the write head 54 on the next tape loop 38 to be activated. When the corresponding tape mark on tape loop 38 is sensed, the write-in function is automatically switched over to the next loop 40. Thereafter, the write-in function is switched in a similar manner to loop 42, following which the full cycle is repeated beginning with tape loop 36. While one tape loop is being used for recording, the others are idling. It is possible, but not recommended, that the tape on the other reels would continue to be driven but that no recording would take place because their write heads would be deactivated. Such an embodiment might require separate drive motors for each set of reels. Head switching in the read mode is accomplished in an analogous manner.

Figure 4:
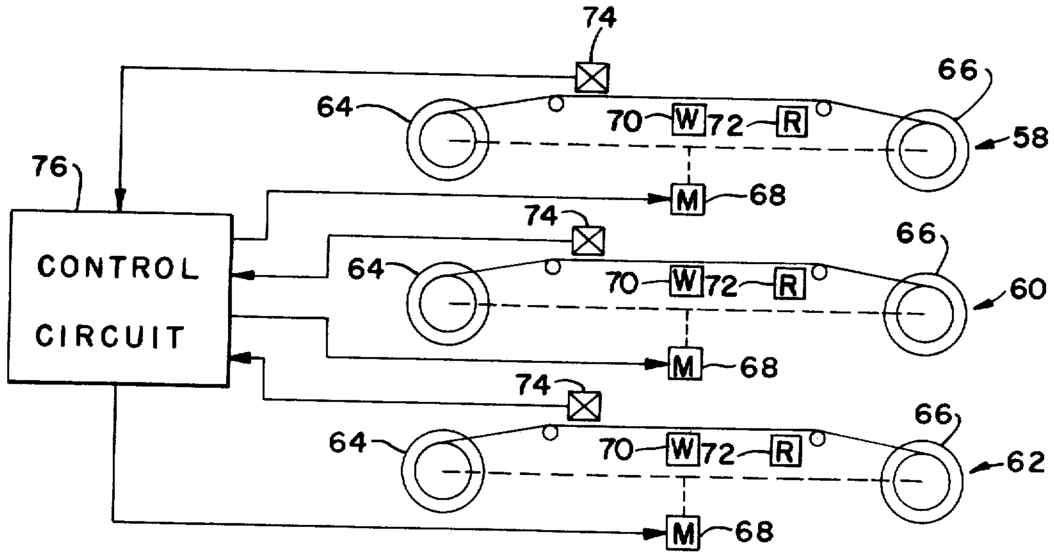

In FIG. 4 another endless recording medium system is illustrated. This system employs three identical reel-to-reel type tape drive units 58, 60 and 62. Each drive unit includes a pair of reels 64 and 66 driven by drive means 68 which may comprise a conventional tape drive motor with means for advancing tape forward and backward between the reels 64 and 66. Each tape unit has a write head 70, a read head 72, and a tape mark sensor 74. Each sensor 74 is connected to a control circuit 76 which controls activation of the write heads 70 and drive units 68 for the respective tape units 58, 60 and 62. Video signals are recorded on the tape units in sequence. For example, video signals are first recorded on tape unit 58, next on tape unit 60 followed by tape unit 62, and then the cycle is repeated beginning with tape unit 58 at which time the signals previously recorded by tape unit 58 are erased as the new signals are applied. To accomplish this continuous operation, when sensor 74 on tape unit 58 senses the approaching end of the tape during recording on tape unit 58, the write-in function is transferred to the already rewound tape on tape unit 60 by deactivating the write head 70 for the tape unit 58 and activating the write head 70 on the tape unit 60. As mentioned in connection with the embodiment of FIG. 3, a programmed delay in deactivation of the finished tape can be employed to ensure full coverage and self identification between recorded tapes. Continuing with the operation, the control circuit 76 causes the tape unit 62 to begin rewinding so that when the sensor 74 for the tape unit 60 signals the approaching end of the tape on the tape unit 60, the tape unit 62 will be rewound and ready for recording. Similarly, the sensor 74 for the tape unit 60 causes the tape unit 58 to begin rewinding while signals are being recorded on the tape unit 62. The operation of the system in the read mode is directly analogous.

The tape mark that causes activation of the next tape and rewinding of the "previous" tape does not necessarily have to be at the extreme end of the tape. If several minutes of additional recording were done on the same tape that has the tape mark, there would be a recording overlap. A second differentially placed tape mark could signify "end of reel" to deactivate its associated drive unit, while the closely preceding first mark would have already activated the next tape unit.

Figure 5B:
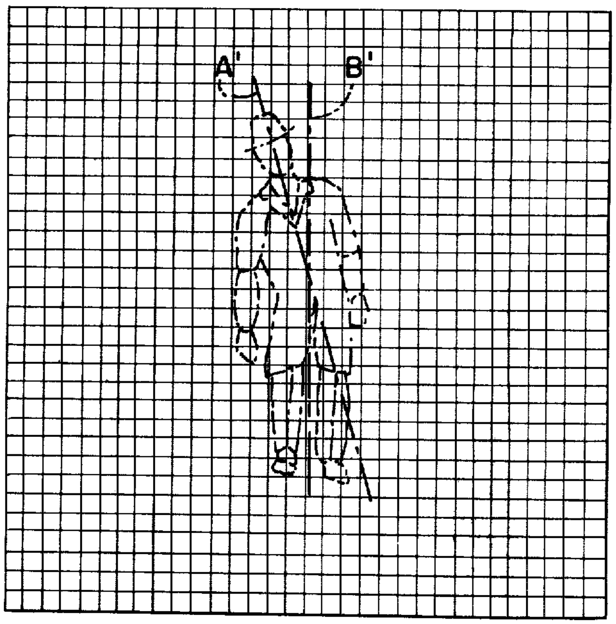
Figure 5C:
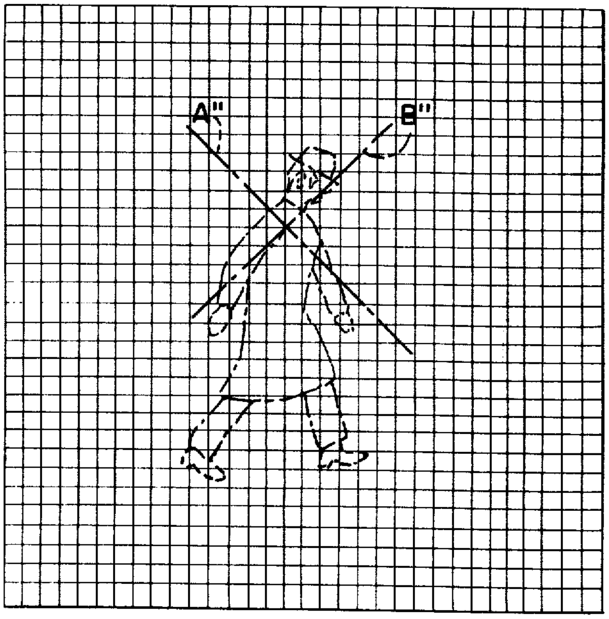
Figure 5A:
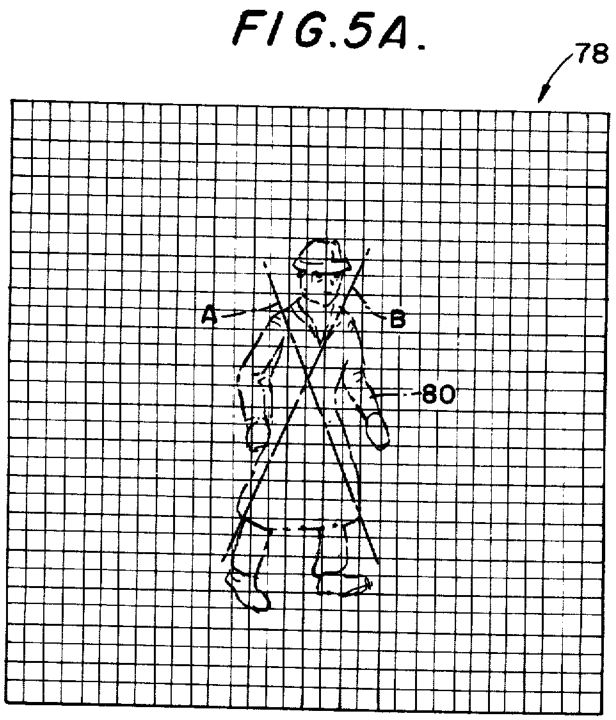

FIGS. 5*a*, 5*b*, 5*c* and 6 illustrate a system for measuring the characteristics of an individual's movement to generate a motion print. In FIG. 5*a* a grid 78 of equally spaced orthogonal lines is overlayed on the video image of an individual 80. Superimposition of the grid 78 may be accomplished while recording or while viewing the video image. For example, the grid 78 may comprise etched lines on a wide angle lens of the video camera so that the scene is continuously recorded as viewed through the grid 78. Alternatively, the grid may be superimposed on one of the monitors 30 or 34 of FIG. 1, or any other monitor or video tube, by means of a pattern generator or an overlay so that the scene while recorded without alteration, will be viewed with the superimposed grid 78. In either event, the individual 80 will be displayed in a manner such that relative angular and linear displacement of his limbs, torso and head can be accurately measured using the grid as a reference. For example, the dashed lines A and B in FIG. 5 intersect in an angle indicative of the angular displacement of the thighs while the individual is walking. In addition to characteristic leg movements, the angle of arc through which the individual swings his arms when walking, cants his head, rotates his torso or weaves to one side or the other can be accurately measured. In FIG. 5*b* the grid 78 is superimposed on a full-faced view of the subject listing to the right with a right step. The angle of list is indicated by the intersecting lines A′ and B′. As a further example, in FIG. 5*c*, the grid 78 enables measurement of the angle (lines A″ and B″) of arc through which the side-viewed subject's arms swing while walking.

In FIG. 6 an arrangement of geometric patterns on an appropriate surface of the area under surveillance is illustrated. Specifically, two rows of equally spaced, aligned diamond-shaped markings 82 are arranged to extend in a direction perpendicular to the optical axis *c* of the video camera 10 associated with the surveillance system shown in FIG. 1. The spacing, *d*, between the two rows of markings 82 may, if desired, be made equal to the lateral width, *e*, of the diamond-shaped markings and the lateral spacing, *f*, between adjacent vertices of the markings 82. Preferably the markings 82 are arranged on the floor of an area under surveillance where individuals entering the guarded area would necessarily pass. The markings 82 should contrast sharply with the surrounding floor so that they will be visible in the recorded video image while appearing to be ornamental to passers by. Because of their predetermined size and spacing, the markings 82 allow careful measurement of the length of the individual's stride as well as his direction and speed of travel. By careful analysis of the recorded video image, the approximate angle of travel of the individual relative to the optic axis *c* for the video camera 10 may be determined. Knowing the angle of travel relative to video camera 10, the operator can make necessary trigonometric adjustments in the calculations of the angular deviations of the limbs, as described in connection with the grid 78 in FIG. 5, in cases where the individual is not traveling in a line strictly perpendicular to the optic axis *c* of the video camera 10.

A superimposed grid 78 (FIG. 5) and the geometric patterns (FIG. 6) can be used separately if desired. However, their concurrent use enhances the value of each, particularly, in arriving at accurate calculations of the deviations of the limbs using the grid 78, as explained above for cases where the individual's direction of travel is not strictly perpendicular to the optic axis of the video camera 10.

Those skilled in the art will recognize that the specific embodiments described herein are susceptible of many variations, modifications and equivalent substitutions without departing from the essential principles and scope of the invention as indicated by the appended claims.

I claim:

1. A surveillance system for providing a recorded video image of a guarded area, comprising video camera means producing a video output signal representing an image of the area under surveillance, an endless magnetic tape loop on which video signals can be stored, video recorder means normally continuously on operatively connected to said video camera means for continuously recording said video signals on said endless tape loop, said recorder means including an endless tape loop transport system including a plurality of center-feeding reels, means for feeding said tape from one reel to the next in a closed path including all of said reels, and means for maintaining the amount of tape wound on at least one of said reels different from the amount of tape wound on other ones of said reels, said video recorder means further providing write head means and a plurality of read head means between a plurality of adjacent ones of said reels, interval timing means operatively connected to said video recorder means for turning said recorder means off following a predetermined interval of time after said timing means is started, and sensor means responsive to a predetermined disturbance in said guarded area for issuing a signal to said interval timing means to start said timing means, whereby upon the sensing of a disturbance, said video recorder means is turned off after a predetermined interval of time.

2. The surveillance system of claim 1, wherein said video recorder means includes means for selectively activating said read head means to provide outputs representing different past time periods.

3. The surveillance system of claim 1, further comprising a pair of video monitors, one of said read head means being adjacent to said write head means between the same two reels on the side toward which said tape advances, one of said monitors being connected to said one of said read head means, and a read head selector unit interconnecting the other of said monitors selectively with a plurality of said read head means.

4. A surveillance system for providing a recorded video image of a guarded area, comprising video camera means producing a video output signal representing an image of the area under surveillance, an endless magnetic tape loop on which video signals can be stored, video recorder means normally continuously on operatively connected to said video camera means for continuously recording said video signals on said endless tape loop, said video recorder means further including an endless magnetic tape transport system including a plurality of endless tape loop systems each having an endless tape loop and means for circulating said loop, read and write head means operatively associated with each said tape loop system, means responsive to the passage of predetermined positions on the tape loops in said respective tape loop systems for interchangeably activating said head means so that said tape loop systems are employed in a repeating predetermined sequence, interval timing means operatively connected to said video recorder means for turning said recorder means off following a predetermined interval of time after said timing means is started, and sensor means responsive to a predetermined disturbance in said guarded area for issuing a signal to said interval timing means to start said timing means, whereby upon the sensing of a disturbance, said video recorder means is turned off after a predetermined interval of time.

5. A surveillance system for providing a recorded video image of a guarded area, comprising video camera means producing a video output signal representing an image of the area under surveillance, an endless magnetic tape loop on which video signals can be stored, video recorder means normally continuously on operatively connected to said video camera means for continuously recording said video signals on said endless tape loop, said video recorder means further including a plurality of reel-to-reel tape transports each having a pair of reels for carrying magnetic tape there between, read and write head means operatively associated with each said tape transport, means for interchangeably activating said head means and controlling the direction of rotation of said reels so that said tape transports are employed in a repeating predetermined sequence thereby providing said endless recording medium, interval timing means operatively connected to said video recorder means for turning said recorder means off following a predetermined interval of time after said timing means is started, and sensor means responsive to a predetermined disturbance in said guarded area for issuing a signal to said interval timing means to start said timing means, whereby upon the sensing of a disturbance, said video recorder means is turned off after a predetermined interval of time.

6. The surveillance system of claim 5, further comprising means for reversing one of said tape transports while the preceding transport is employed for recording so that said one tape transport will be rewound and ready when the preceding transport has been fully utilized for recording.

7. A surveillance system for providing a recorded video image of a guarded area, comprising video camera means producing a video output signal representing an image of the area under surveillance, an endless magnetic tape on which video signals can be recorded, video recorder means operatively connected to said video camera means for recording said video signals on said tape, at least one video monitor, a write head and plurality of separately operable read heads spaced apart along the path of said endless tape, and selector means for individually activating said read heads to provide outputs to said video monitors representing different past time periods.

8. The surveillance system of claim 7, wherein there are at least three of said read heads.

9. The surveillance system of claim 7, further comprising an endless loop tape transport system including a plurality of tape delay transfer units for accepting and feeding moving tape while continuously storing a constant length segment of moving tape, said tape being fed from transfer unit to transfer unit such that it forms an endless loop, said read heads being stationed respectively alongside the tape feed path between corresponding adjacent ones of said tape delay transfer units.

10. The surveillance system of claim 9, wherein there are at least three transfer units and read heads.

11. The surveillance system of claim 9, wherein said transfer units are in the form of center-feeding tape reels having at any given time a predetermined length of tape wound thereon corresponding to a predetermined delay.

12. The surveillance system of claim 11, wherein there are at least three of said center-feeding tape reels and read heads.

13. The surveillance system of claim 11, wherein the predetermined length of tape wound on at least two of said reels differs.

14. The surveillance system of claim 8, wherein there are two of said video monitors, one of which is connected to the read head nearest to said write head in the direction of normal tape movement, and the other monitor being connectible via said selector means to any one of the other read heads to view a selected past time period.

* * * * *